United States Patent

[19]

Humphrey

[11] 4,077,218

[45] Mar. 7, 1978

[54] ARTICULATED JOINT

[75] Inventor: Kenneth Michael Humphrey, Fleet, England

[73] Assignee: Underwater and Marine Equipment Limited

[21] Appl. No.: 643,285

[22] Filed: Dec. 22, 1975

[30] Foreign Application Priority Data

Dec. 19, 1974 United Kingdom ............... 55078/74

[51] Int. Cl.² .............................................. B63C 11/04
[52] U.S. Cl. ..................................... 60/592; 2/2.1 R; 61/70; 285/11
[58] Field of Search .................. 2/2.1 R; 60/592, 584, 60/585, 589; 285/10, 11; 61/70

[56] References Cited

U.S. PATENT DOCUMENTS

| | | | |
|---|---|---|---|
| 1,821,274 | 9/1931 | Plummer | 285/11 |
| 1,888,026 | 11/1932 | Chapman | 285/11 |
| 1,947,657 | 2/1934 | Peress | 285/11 |
| 2,367,707 | 1/1945 | Amery | 60/592 |
| 3,754,779 | 8/1973 | Peress | 2/2.1 R |
| 3,759,550 | 9/1973 | Peress | 2/2.1 R |
| 3,772,890 | 11/1973 | Altmeppen | 60/592 |
| 3,913,328 | 10/1975 | Shaffer | 60/592 |

Primary Examiner—Martin P. Schwadron
Assistant Examiner—Abraham Hershkovitz
Attorney, Agent, or Firm—Michael J. Striker

[57] ABSTRACT

A joint, subject to a pressure differential between inside and outside, having two tubular members flexibly joined by couplings comprising an annular piston sliding within an annular cylinder containing an incompressible fluid, a fluid reservoir connected to and at a higher pressure than the cylinder interior and valve means responsive to fluid loss from the cylinder allowing fluid flow from reservoir to cylinder. The valve may comprise two semi-circular arms pivoted at their ends to each other and to the piston or cylinder, the arms operating on opposite ends of a rocker plate attached centrally to a valve plunger. A differential piston maintains the high reservoir pressure. The valve is adjustable to operate at a predetermined value of cylinder fluid volume.

15 Claims, 2 Drawing Figures

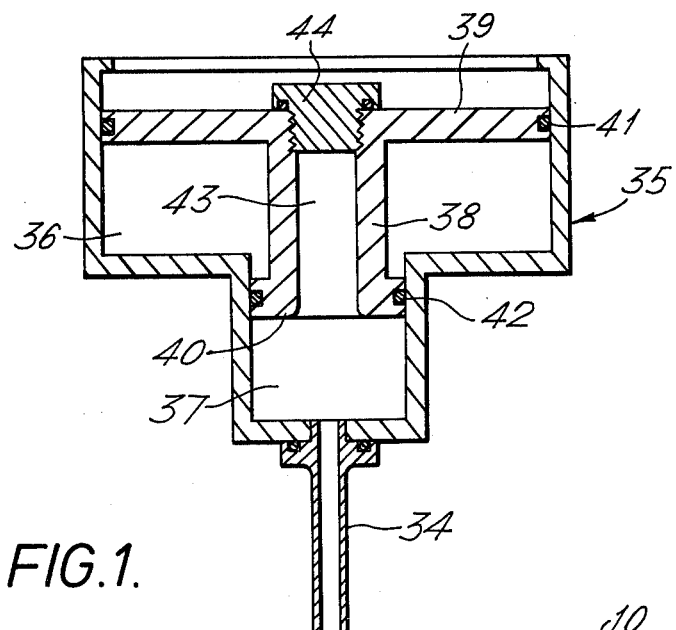
FIG.1.
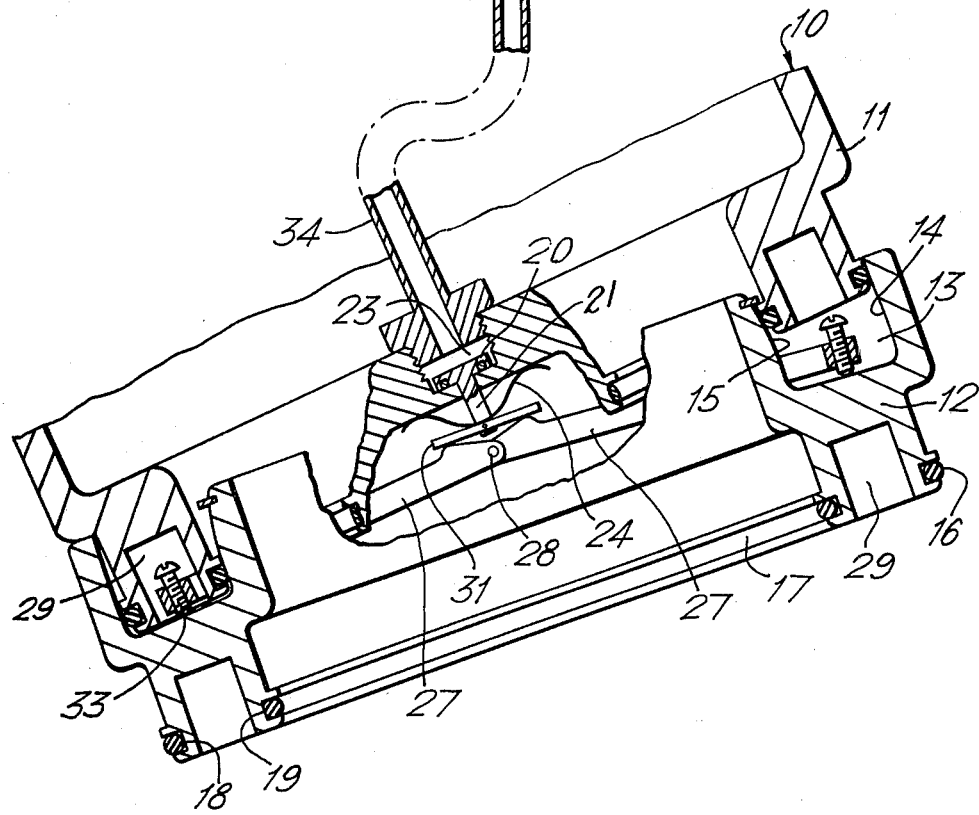

ARTICULATED JOINT

This invention relates to articulated joints for joining one tubular member to another tubular member whilst being subjected to a pressure differential between inside and outside of the joint, for example a joint for an atmospheric pressure undersea diving suit, such joints having at least one coupling comprising an annular piston member slidably located within an annular cylinder member which contains a substantially incompressible fluid. A joint as above described will hereafter be referred to as "a joint of the kind described".

As the piston member of such a joint slides along the cylinder member, fluid contained in the cylinder member is wiped along the cylinder walls and therefore a gradual loss of fluid from the cylinder occurs. Eventually sufficient fluid would be lost from the cylinder for the joint to seize if regular maintenance of the joint was not performed.

It is an object of this invention to provide means whereby the fluid lost from the cylinder is replaced continuously.

According to the present invention, a joint of the kind described includes apparatus for maintaining substantially constant the volume of fluid in the cylinder member, said apparatus comprising a reservoir of fluid connected to the interior of the cylinder member of the joint, means for maintaining the pressure within said reservoir higher than that within said cylinder member and valve means operable in response to a reduction in the volume of fluid within said cylinder member to allow flow of fluid from said reservoir into said cylinder member.

Means may be provided for adjusting the valve means for it to operate at a predetermined low value of said volume.

The valve means may be located preferably in the piston member or alternatively in the wall of the cylinder member. The valve means may comprise a pair of actuating arms pivotally attached to each other and to the member in which the valve means is located by a common pivot. The actuating arms may be of semi-circular configuration and pivoted together at their ends. The piston may have an annular recess in its end face to accommodate the actuating arms.

The actuating arms may contact opposite end regions of a rocker plate which is pivotally attached to the plunger of a poppet valve at a central region of the plate at a point lying between those points contacted by the respective actuating arms. The valve may be resiliently biased towards the valve closed position.

The means for adjusting the valve means to operate at a predetermined low value of the volume of fluid in the cylinder may comprise an adjusting screw passing through a respective actuating arm and bearing upon that member not containing the valve means. In the preferred embodiment in which the valve means is located in the piston, the adjusting screws may bear upon the bottom of the cylinder. The adjusting screws may be situated diammetrically opposite each other at the centre of each actuating arm.

Alternatively the adjusting means may comprise an adjusting screw passing through each actuating arm and bearing upon the rocker plate or a pair of adjusting screws passing through the rocker plate and bearing one upon each actuating arm.

The means for maintaining the pressure within the reservoir higher than that within the cylinder may comprise a differential piston having two parts of different diameter. The part of the differential piston having the smaller diameter may operate on the fluid in the reservoir and the part having the larger diameter may be operated upon by ambient pressure.

An embodiment of the invention will now be described with reference to the accompanying drawings, in which:

FIG. 1 is a fragmentary sectional side view of an articulated joint according to the invention.

Figure 2:
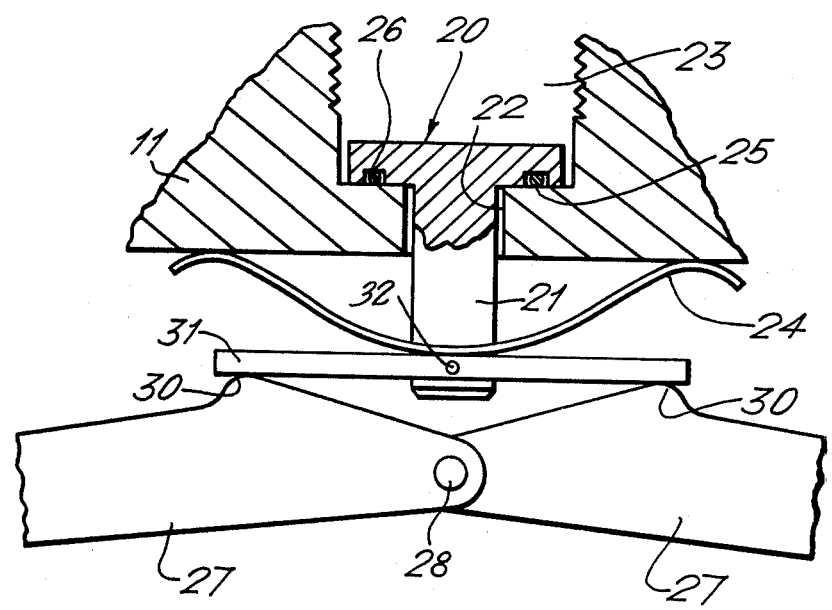
FIG. 2 is an enlarged fragmentary side view of a valve means shown in FIG. 1.

FIG. 1 shows a joint denoted generally by the numeral 10 comprising an annular piston 11 slidably located in an annular cylinder 12. The annular space 13 between the piston 11 and the cylinder 12 is filled with a substantially incompressible fluid. The side walls 14, 15 of the cylinder 12 are part spherical, and are contacted by sealing rings 16, 17 located in annular grooves 18, 19 in the piston 11. As the sealing rings 16, 17 slide back and forth along the sidewalls 14, 15 fluid from the inside of the annular space 13 is deposited on the sidewalls 14, 15 and in this way the volume of fluid in the annular space 13 would normally gradually reduce. This volume is restored by causing fluid to flow into the space 13 via a valve denoted generally by the numeral 20.

The poppet valve 20 has a cylindrical valve plunger 21 which protrudes through an aperture 22 in the bottom of a circular recess 23 in the piston 11. A leaf spring 24 resiliently biases the plunger 21 towards a position in which the aperture 22 is sealed. An annular sealing ring 25 located in a recess 26 in the plunger 21 ensures that fluid in the recess 23 cannot pass through the aperture 22 into the annular space 13 until the plunger 21 is lifted. Movement of the plunger 21 is effected by a pair of actuating arms 27, each of semi-circular configuration, which are provided together at their ends by means of pivot pins 28. The actuating arms 27 are accommodated in an annular recess 29 in the piston 11 and are pivotally attached to the piston 11 by the pivot pins 28. Each actuating arm has a cam shoulder 30 which contacts a respective end region of a rocker plate 31 pivotally attached at its central region, by pivot pin 32, to the valve plunger 21. The two cam shoulders 30 contact the rocker plate 31 on opposing sides of the pivot 32.

At the mid-point of each actuating arm 27 there is a screw 33 passing through the actuating arm 27 and bearing upon the bottom of the cylinder 13. By means of these screws 33 the opening of the valve 20 can be arranged to occur at any predetermined value of the volume of fluid present in the annular space 13. The operation of the valve mechanism is as follows. When the annular space has lost no fluid, if the piston 11 and cylinder 12 tilt relative to each other there will be either equal tilting movement of the two actuating arms 27 in the same sense, or no tilting of the actuating arms. This will have the effect of either merely tilting the rocker plate 31 relative to the plunger 21, or not tilting the plate at all, but will not have the effect of lifting the plunger 21. The aperture 22 remains sealed by the poppet valve 20.

However, if there is a loss of fluid from the annular space 13, the piston 11 will move closer to the cylinder 12 irrespective of any relative tilting between them. As a consequence of this closing movement there is pivotal movement of the actuating arms 27 equally and in opposite directions. This pivotal movement of the arms is independent of any movement due to relative tilting of the piston 11 and cylinder 12, and has the effect of lifting the plunger 21, against the resistive force of the spring 24, by the cam shoulders 30. Fluid can then flow from the recess 23 into the annular space 13 to restore the volume of fluid in the annular space 13 to the predetermined value.

The fluid in the recess 23 is maintained at a higher pressure than that in the annular space 13 so that fluid must flow from the recess 23 to the space 13 when the valve 20 is open. Recess 23 is connected via pipe 34 to a fluid reservoir unit denoted generally by the numeral 35 comprising two coaxial cylinderical chambers 36, 37 in which a differential piston 38 is slidably located. The pipe 34 is connected to the chamber 37, which in the embodiment shown has a smaller diameter than chamber 36 and is filled with fluid so as to act as a supply reservoir. The piston 38 has two different diameter portions 39, 40 having diameters corresponding to the internal diameters of the chambers 36, 37. Sealing rings 41, 42 are located in annular grooves around the peripheries of the two portions 39, 40 of the piston 38 to seal the chambers 36, 37. The piston 38 has an axial bore 43 through which fluid may be introduced into chamber 37 periodically to replace fluid which has transferred from chamber 37 to the joint 10. The axial bore 43 is sealed by a plug 44. The interior of chamber 36 is maintained at a pressure substantially atmospheric and the outside face of the larger diameter portion 39 of the piston 38 is subjected to ambient pressure greater than atmospheric. Due to the difference in the diameters of the two chambers 36, 37 the fluid in chamber 37 will be subjected to a greater pressure than ambient.

If the joint is to work in an environment in which the pressure is less than atmospheric the relative diameters of the chambers 36, 37 and portions of the piston 39, 40 should be reversed, i.e. chamber 37 and piston portion 40 should have a greater diameter than chamber 36 and piston portion 39.

What is claimed is:

1. An articulated joint, particularly for an underwater diving suit, comprising a first joint member provided with an axial end face having an annular groove; a second joint member having an annular section received in said groove and defining therewith a liquid-filled chamber, said joint members being articulately displaceable with reference to one another and such displacement resulting in gradual loss of liquid from said chamber; a liquid reservoir connected with said chamber; means for maintaining said reservoir at a pressure higher than the pressure in said chamber; and valve means in said second member interposed between said reservoir and said chamber for normally separating the same from one another, said valve means being responsive to a reduction in the volume of liquid in said chamber due to liquid loss therefrom by communicating said reservoir with said chamber for replenishment of the lost liquid.

2. An articulated joint according to claim 1, further comprising valve adjustment means for adjusting the valve means to operate at a predetermined value of said volume.

3. An articulated joint according to claim 2 wherein said second member has a wall and a portion of said valve means is carried by said wall.

4. An articulated joint according to claim 1 wherein the valve means comprises a pair of actuating arms and a pivot, said arms being pivotally attached to each other and to the member in which the valve means is located by said pivot.

5. An articulated joint according to claim 4 wherein said actuating arms are of semi-circular configuration and are pivoted together at their ends.

6. An articulated joint according to claim 5 wherein said second member has an end face and an annular recess in said end face to accommodate said actuating arms.

7. An articulated joint according to claim 5 wherein said valve means further comprises a valve plunger and a rocker plate which is attached at its centre to said valve plunger, and wherein said actuating arms contact opposite ends of said rocker plate.

8. An articulated joint according to claim 7 wherein said valve adjusting means comprises an adjusting screw passing through a respective actuating arm, said screws bearing upon said rocker plate.

9. An articulated joint according to claim 7 wherein said valve adjusting means comprises a pair of adjusting screws passing through said rocker plate, each screw bearing upon one of said actuating arms.

10. An articulated joint according to claim 5 wherein said valve adjusting means comprises an adjusting screw passing through a respective actuating arm, said screws bearing upon that member in which the valve means is located.

11. An articulated joint according to claim 10 wherein the adjusting screws are situated diametrically opposite each other at the center of each actuating arm.

12. An articulated joint according to claim 1 wherein said valve means is resiliently biassed towards a closed position thereof.

13. An articulated joint according to claim 1 wherein said means for maintaining the pressure within said reservoir higher than that within said chamber comprises a differential piston having two parts of different diameter.

14. An articulated joint according to claim 13 wherein the part of the differential piston having the smaller diameter is acted upon by the liquid in the reservoir.

15. An articulated joint according to claim 13 wherein the part of the differential piston having the larger diameter is acted upon by ambient pressure.

* * * * *